(12) United States Patent
Atkin et al.

(10) Patent No.: US 8,245,194 B2
(45) Date of Patent: Aug. 14, 2012

(54) AUTOMATICALLY GENERATING UNIT TEST CASES WHICH CAN REPRODUCE RUNTIME PROBLEMS

(75) Inventors: Steven E. Atkin, Wesley Chapel, FL (US); Xing Jiang Huang, Shanghai (CN); Jun Yin, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 992 days.

(21) Appl. No.: 11/873,572

(22) Filed: Oct. 17, 2007

(65) Prior Publication Data

US 2008/0256517 A1 Oct. 16, 2008

(30) Foreign Application Priority Data

Oct. 18, 2006 (CN) .......................... 2006 1 0135534

(51) Int. Cl.
*G06F 9/44* (2006.01)
(52) U.S. Cl. ......... 717/124; 717/106; 717/126; 717/127
(58) Field of Classification Search .................... None
See application file for complete search history.

(56) References Cited

U.S. PATENT DOCUMENTS

| | | | |
|---|---|---|---|
| 4,819,233 A | 4/1989 | Delucia et al. | |
| 5,130,988 A | 7/1992 | Wilcox et al. | |
| 5,604,895 A | 2/1997 | Raimi | |
| 6,067,639 A | 5/2000 | Rodrigues et al. | |
| 6,738,778 B1 | 5/2004 | Williamson et al. | |
| 7,134,113 B2* | 11/2006 | Williams | 717/106 |
| 7,478,365 B2* | 1/2009 | West et al. | 717/124 |
| 7,490,319 B2* | 2/2009 | Blackwell et al. | 717/124 |
| 7,596,778 B2* | 9/2009 | Kolawa et al. | 717/126 |
| 7,627,843 B2* | 12/2009 | Dozorets et al. | 716/106 |
| 7,747,984 B2* | 6/2010 | Hsu | 717/124 |
| 7,908,590 B1* | 3/2011 | Min et al. | 717/124 |

(Continued)

FOREIGN PATENT DOCUMENTS

WO WO 0101256 1/2001

OTHER PUBLICATIONS

"Boundary testing", Wikipedia, 1 page, <http://en.wikipedia.org/wiki/Boundary_testing>.*

(Continued)

*Primary Examiner* — Thuy Dao
(74) *Attorney, Agent, or Firm* — Steven Chiu

(57) ABSTRACT

A method and system for automatically generating unit test cases for a computer program that can reproduce runtime problems. The method comprises: modifying the computer program according to one or more interested target program units in the program and possibly occurring run time problems; test executing the modified program; and automatically generating unit test cases according to the interested runtime problems occurring during the execution of the interested target program units. Wherein the modifying step adds captor code and problem detective code into the program, the captor code being configured to record the execution paths and execution contexts of the interested target program units in the program; and the problem detective code being configured to detect the interested unexpected exceptions possibly raised and the interested violations of predefined behavior rules possibly produced by the execution of the program units. The present invention further provides methods and systems for debugging and for regression testing using the above method, and a computer program testing method and system.

14 Claims, 6 Drawing Sheets

U.S. PATENT DOCUMENTS

| | | | |
|---|---|---|---|
| 8,006,233 B2 * | 8/2011 | Centonze et al. | 717/126 |
| 8,056,060 B2 * | 11/2011 | Bicheno et al. | 717/127 |
| 8,087,001 B2 * | 12/2011 | Hoyek et al. | 717/124 |
| 2004/0181713 A1 * | 9/2004 | Lambert | 714/48 |
| 2005/0223361 A1 * | 10/2005 | Belbute | 717/124 |
| 2006/0230320 A1 * | 10/2006 | Salvador et al. | 714/38 |
| 2007/0168975 A1 * | 7/2007 | Kessler | 717/124 |

OTHER PUBLICATIONS

"Regression testing", Wikipedia, 3 pages, <http://en.wikipedia.org/wiki/Regression_testing>.*

* cited by examiner

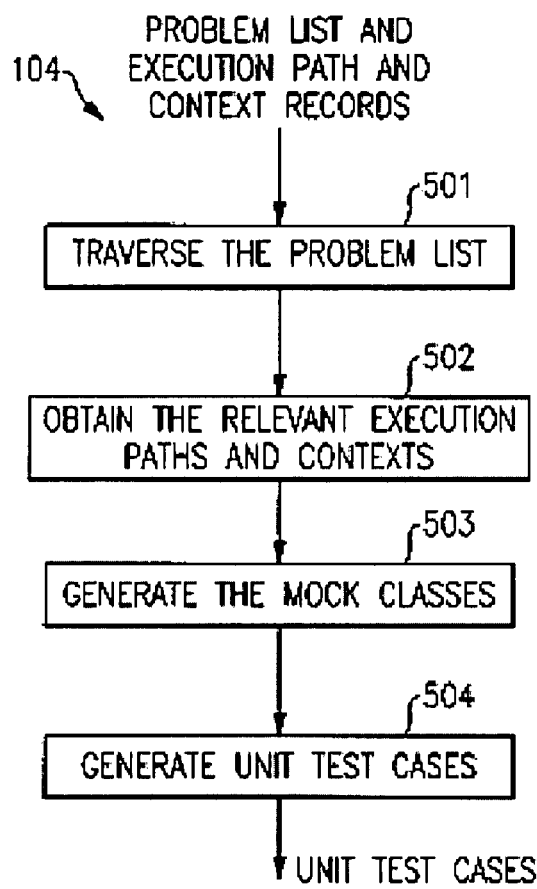
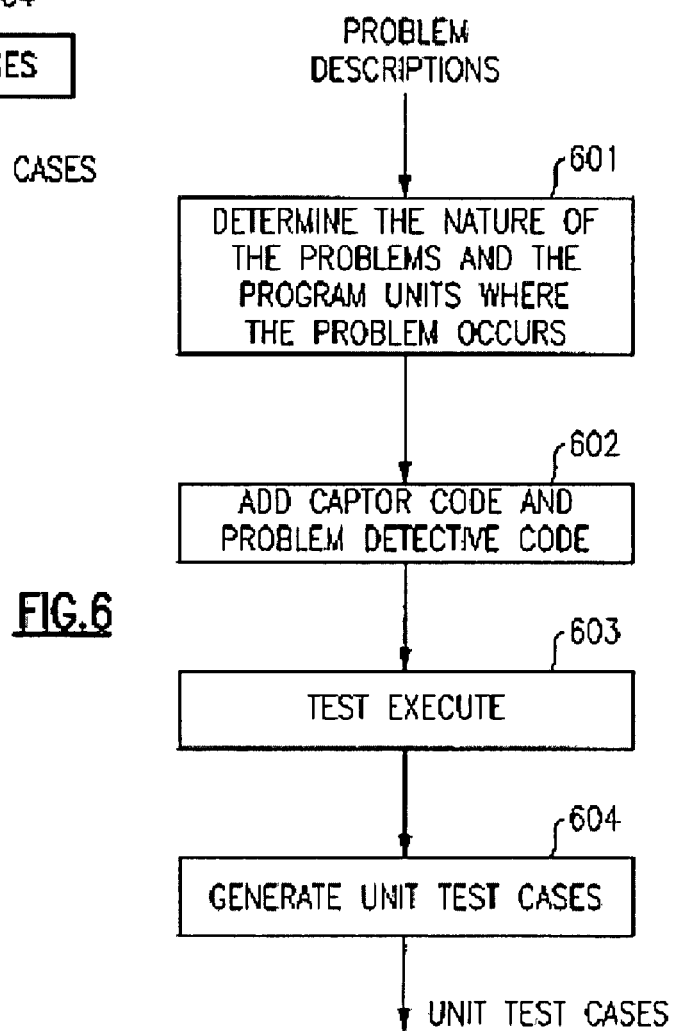

AUTOMATICALLY GENERATING UNIT TEST CASES WHICH CAN REPRODUCE RUNTIME PROBLEMS

FIELD OF THE INVENTION

The present invention relates to the field of the testing and debugging of computer programs, in particular to a method and system for automatically generating unit test cases for a computer program which can reproduce runtime problems.

BACKGROUND OF THE INVENTION

The development of software products such as those from IBM typically follows a process where the development team is responsible for the development and unit tests of the product, while a specialized testing team will be in charge of other verification tests, and problems found during the verification tests will be returned to be solved by the development team. A unit test is a white box test, the purpose of which is to test the code logics, while a verification test is a black box test, and is used to verify the functions and behaviors of the software.

During the verification tests, many runtime problems may be found, such as unexpected exceptions and incorrect or abnormal program behaviors. Since the testing team and the development team are independent of each other, and the testing environment and the development environment are not identical either, problems found during the verification tests typically can only be fed back to the development team through textual descriptions of the testers or the log information of the software itself. Because the testing environment lacks debugging tools, and the problem descriptions and log information cannot be directly used for debugging, the development team has to recreate a testing environment according to the problem descriptions for debugging, which is a very tedious and inefficient process. And sometimes, it is very difficult to reproduce the runtime problems and find their causes.

Moreover, when the development team has corrected the currently found problems or developed a new version of the software, since new code has been added, the testing team must still ensure that previously found and corrected problems remains being correct, without being affected by the current modifications, that is, to, perform the so-called regression tests. Although the testing team must perform regression tests, if the development team is able to ensure the correctness of the regression tests in advance, then the testing team needs only to perform a verification test, thus undoubtedly improving the test efficiency. Since the development team's testing tools are usually unit test cases, it is necessary for the development team to develop a unit test case for each found problem, which can verify whether it is corrected. But due to the reason of the previous problem, the debugging work being already complex, developing unit test cases based on problems is also a very tedious process, and is often omitted by the development team.

Current automatic testing tools, such as Rational Robot and WinRunner, etc., are only oriented to testing teams and testing processes, and its starting point is to substitute for the testers, repetitive actions. They focus on reproducing runtime problems via recording and playing back the end user's actions, such as keystrokes and mouse clicks, rather than capturing internal programmatic behaviors. They generate scripts to simulate the inputs from the end user or from the runtime environment. It is difficult to determine how many user interactions lave to be recorded in order to reproduce the problem. And the execution time required to reproduce the problem may not be optimal because unrelated activities may be contained in the playback script.

Unit test is now widely used in software development process. Developers can find and eliminate (defects quickly and simply by executing unit test suite before the program is delivered to the verification test. Generally speaking, the cost of unit test is much lower than the verification test.

There are also at present several technologies and pre-ducts that can help developers to generate unit test cases such as JTest. They generate unit test cases based on the static analysis of the source code rather than the runtime context. However, static analysis alone cannot determine the context of how the data is used. And it cannot make use of the runtime context and state to create test cases which can reproduce runtime problems. As such, none of them can link the testing process and development process so as to solve the above problems.

Therefore, if it is possible to automatically generate unit test cases, the above two problems will be solved effectively: on the one hand, the development team can directly use these unit test cases for debugging, saving the work of recreating the testing environment; on the other hand, the development team can add these test cases into the unit test process, to ensure the correctness of the regression test.

The U.S. Pat. No. 6,738,778, entitled "Method and Apparatus for Monitoring the Execution of a Program", discloses a tracking and debugging tool, which can be invoked in a program, and can automatically collect and print program running information (e.g., which line of which class the program is currently running in). However, this patent only prints the tracking information for debugging, rather than generating unit test cases. In addition, it cannot actively find errors and exceptions in the execution of the program, and thereby activating the generation of unit test cases.

The U.S. Pat. No. 6,067,639, entitled "Method for Integrating Automated Software Testing with software Development" discloses an automatic software testing method that needs to be integrated in the development process. The method requires the software developers to develop some test operation objects while in the development process, each of which test operation objects implements invoking a certain operation on the program. Thus, in testing, the software testers can write automatic test programs or scripts, to automate the software testing by invoking the test operation objects in the program under test. Since these objects provide a uniform interface, the testers need not develop different automatic test programs or scripts for different testing environments. However, this patent requires the software developers to develop test operations objects based on a uniform interface, which in fact amounts to developing test cases, rather than automatically generating unit test cases. Moreover, it requires the developers to develop test operations objects while at the time of developing the program.

From the foregoing, it can be seen that there is apparently a need in the art for a method and system for automatically generating unit test eases based on runtime problems.

BRIEF SUMMARY OF THE INVENTION

In order to solve the above problems in the prior art of the difficulty to reproduce runtime problems and to facilitate regression tests due to the inability of generating unit cases in the testing environment and to bring about other benefits, the present invention is proposed.

According to an aspect of the present invention, there is provided a method for automatically generating unit test cases for a computer program that can reproduce runtime problems. The method comprises the steps of: modifying the computer program according to one or more interested target program units in the program and possibly occurring runtime problems; test executing the modified program; and automatically generating unit test cases according to the interested runtime problem is occurring during the execution of the interested target program units.

According to another aspect of the present invention, there is provided a method for automatically generating unit test cases for a computer program that can reproduce runtime problems. The method comprises the steps of: determining the nature of the problems and the program units where the problems occurred based on the test problem descriptions of the computer program generated in the testing; modifying the program based on the determined nature of the problems and the program unit where the problems occurred; test executing the program; and generating unit test cases based on the detected problem and the execution paths and contexts as recorded by the captor code.

According to another aspect of the present invention, there is provided a computer program testing method. The method comprises the steps of adding captor code and problem detective code into the program the captor code being configured to record, the execution paths and execution contexts of interested target program units in the program, and the problem detective code being configured to detect and record interested unexpected exceptions possibly raised and interested violations of predefined behavior rules possibly produced by the execution of the program units, and test executing the program with the additions to detect and record the interested unexpected exceptions and violations of predefined behavior rules.

According to another aspect of the present invention, there is provided a system for automatically generating unit test cases for a computer program that can reproduce runtime problems. The system comprises: a modifying module for modifying the program according to one or more interested target program units and possibly occurring runtime problems; a test execution module for test executing the modified program; and a unit test case generation module for automatically generating unit test cases according to the interested runtime problems occurring during the execution of the interested target program units.

According to another aspect of the present invention, there is provided a computer program testing apparatus. The apparatus comprises: a modifying module for adding captor code and problem detective code into the program, the captor code being configured to record the execution paths and execution contexts of interested target program units in the program, and the problem detective code being configured to detect and record interested unexpected exceptions possibly raised and interested violations of predefined behavior rules possibly produced by the execution of the program units; and a test execution module for test executing the program with the additions to detect and record the interested unexpected exceptions and violations of predefined behavior rules occurring during the execution of the interested program unit.

According to another aspect of the present invention, there is provided computer program product comprising computer readable medium having program instruction contained thereon for causing a system with data processing capabilities to perform the steps of any of the above described methods.

From the foregoing, it is apparent that one of the purposes of the present invention is to help a development team to correct errors and to ensure the correctness of regression tests, thereby enhancing the efficiency of software development and testing. At the same time, since the present invention can define behavior rules for generating test cases, it is also possible to find potential problems that have not occurred, thus helping the development team or testing team to find problems.

The present invention includes various advantages. Unit test cases can be generated based on runtime contexts to reproduce runtime problems. As such because irrelevant operations are eliminated, the execution time required to reproduce runtime problems is reduced substantially, thus facilitating the debugging of the program. Developers only need to work around the unit test cases, without having to recreate the complex environment in the verification test, thus substantially saving time and effort. Developers can use the unit test cases to simplify the validation of old problems after new code changes are applied. It is conducive to find potential problems, that is, it is conducive to the verification test of the program.

BRIEF DESCRIPTION OF THE DRAWINGS

The novel features believed to be characteristic of the present invention are set forth in the appended claims. However, the present invention itself and preferred made of use, further objects and advantages thereof can be better understood by referring to the following detailed description of the illustrative embodiments when read in conjunction with the drawings

FIG. 5 illustrates a flowchart of the detailed steps in the step of generating unit test cases according to a problem list and execution paths and execution contexts in the method as shown in FIG. 1 according to an embodiment of the present invention;

FIG. 6 illustrates a flowchart of a method for automatically generating unit test cases which can reproduce runtime problems according to another aspect of the present invention;

PREFERRED EMBODIMENTS OF THE INVENTION

Figure 1:
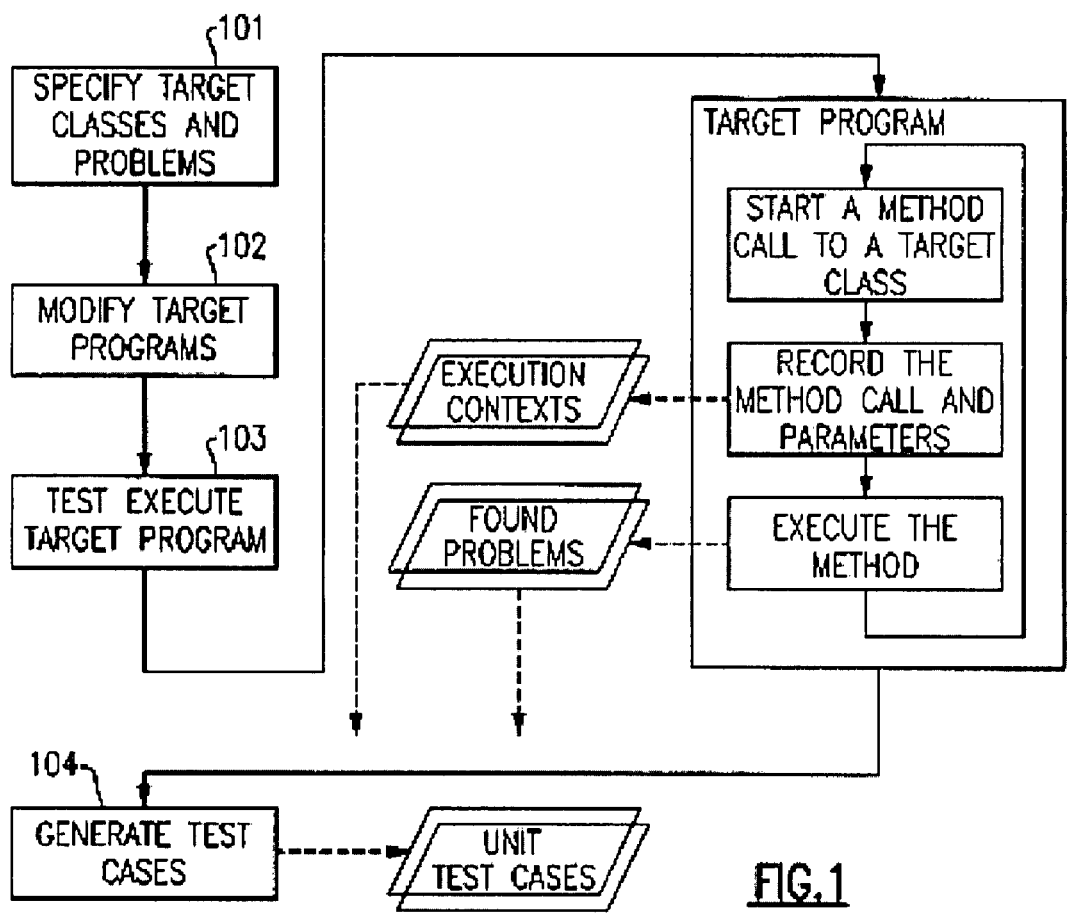
FIG. 1 illustrates a schematic flowchart of a method for automatically generating unit test cases which can reproduce runtime problems for a computer program according to an embodiment of the present invention.

The present invention discloses a method and system for automatically generating unit test cases which can reproduce runtime problems. The system or method uses added detective code to detect pre-specified runtime problems, such as unexpected exceptions and abnormal program behaviors. At the same time, the system or method uses added captor code to collect the execution context and execution path of a specified object. When a problem occurs in the testing process, the system or method can generate a unit test case for the object.

The unit test case can reproduce the problem by replaying the execution path of the object with the recorded context.

In the following, embodiments of the present invention will be described with reference to the drawings, it being understood, however, that the present invention is not limited to the described specific embodiments. The numerous specific details presented in the drawings and the following description are only for the purpose of illustration, in order for those skilled in the art to fully understand the essential idea of the present invention and to practice the present invention, and are not intended to limiting the present invention.

FIG. 1 illustrates the general steps of a method for automatically generating unit test cases which can reproduce runtime problems for a computer programmer such as a Java program, according to an embodiment of the present invention.

In step 101, the interested target program units and possibly occurring runtime problems are determined. For an object oriented program such as a Java program a target program unit can be a target class. Preferably, the step 101 it performed in a development environment. The step can be performed in a GUT tool, that is, the user can specify the target classes and runtime problem through the GUI tool, which will in turn generate the configuration information including the determined target classes and runtime problems to be provided to the next step according to the user's specification. The step can also be performed manually by the user, that is, the user can manually formulate the configuration information including the specified target classes and runtime problems to be provided to the next step; the step can also be combined with the next step of modifying the target problem, which is to be described hereinafter, that is, the interested target classes and runtime problems are embodied in how and where the target program is to be modified, and in this case, the method may not have the specifying step 101.

The target classes include classes to be unit tested. All objects of a target class will be tracked in order to generate a unit test case. A target class can be determined through its qualified name.

The runtime problems can be unexpected exceptions or violations of predefined behavior rules unexpected exceptions are unchecked runtime exceptions raised by object methods, such as java.lang.NullPointerException in a Java program, which is raised when the program attempts to call an object method on a null object. Often they are the causes of errors. An unexpected exception can be determined through the qualified name of a method and the type of the exception. Predefined behavior rules describe the normal behaviors of a specified object, including the proper method call order, valid method parameters and returned values, etc.

In a preferred embodiment, before the step 101, there is also a step of defining behavior rules for defining the predefined behavior rules to be specified in step 101. The step of defining behavior rules is preferably performed in the development environment. One method for defining a behavior rule includes determining a rule template and target method, and developing the examination code. Rule templates include predefined patterns, such as "Never call <X> when <CONDITION>", "Never call <X> before <Y> of an object when <CONDITION>", etc. The target method defines what methods of what classes specifically the "<X>", "<Y>" in the template are, such as defining "<X>" is java.lang.String-.charAt(int), which will determine the location where the examination code is to be inserted. The examination code is to implement the examination of the <CONDITION> in the template on the object, parameters, returned value of the target method before and after the method is called. In a preferred embodiment of the present invention, the examination code is implemented by inheritance from a rule abstract class. For example, for the above mentioned template "Never call <X> when <CONDITION>", it is needed to inherit from an AbstractNevercallXRule class, and overload the matchedX method, thereby the examination can be performed with respect to the obtained context. The rule abstract class is part of the template, through which the specific implementation of the template is hidden, thus developers can focus on the development of the examination code when developing rules.

It should be noted that the step of defining rules to be specified through rule templates and rule abstract classes is only one implementation of defining and specifying rules of the present invention. The present invention can also adopt other methods for defining and specifying rules, such as by inserting the examination code directly (the step of defining and specifying rules are implied in the process of inserting the examination code). etc.

As an example of the rules, the globalization function of Java can have rules in relation to code point handling, string handling, encoding, etc. As a more specific example, java-.lang.String substring(intbeginIndex, intendIndex) method is used to extract a substring from a string by simply extracting from an array char[ ] of the 16 bit char type the sub char[ ] defined by beginIndex and endIndex. However, since some Unicode supplementary characters are represented by two 16 bit chars, such as the char "\uD840\uDC00" representing a supplementary Chinese character, and combination characters in some languages, such as "Á", can also be represented by "\u0041\u0300" (the character A and a combining character, the grave accents, when using String.substring, it is possible that a substring with incomplete characters are extracted. Therefore, such a rule can be defined such that before each String.substring used in the program, the passed parameters and the string itself are examined, and if beginIndex and endIndex are found to be on an incomplete character, the violation of a rule is triggered. This rule can further be defined broader by specifying that as long as the string contains characters represented by multiple chars, the substring method cannot be used directly, whether beginIndex and endIndex will obtain an incomplete character or not, because this can lead to potential errors.

In step 102, the target program is modified according to the determined target classes and runtime problems, that is, the captor code (as shown in the dashed line block in FIG. 1) and problem detective code (as shown in the dashed line blocks in FIG. 2 and FIG. 3) are added into the target program. Preferably, the step 102 is performed in the development environment.

In a preferred embodiment of the present invention, the captor code and problem detective code are added into a compiled Java bytecode program. A bytecode insertion tool can be used to modify the class files of the target program, in order to add the captor code and problem detective code. However, in another embodiment of the present invention, as described below, methods are provided that can be invoked in source code, for adding the captor code and problem detective code manually or through a tool to activate the generation of test cases.

The captor code is mainly used to record each external method call to a target class object, and the values of all the parameters of the method call, as the execution path and execution context of the target class object.

There are many methods for modifying bytecode that can capture the parameters and result of a method call, whether at the place of the method call or inside the method body. In Java Virtual Machine (JVM), a method call has only a single bytecode, the parameters passed into the method are just all the objects in the JVM parameter stack before the bytecode for executing the method call, and after the execution of the bytecode for the method call, the JVM parameter stack will be flushed and filled with the return value. As such, a simple method for obtaining the context is to replace the bytecode for the method call; making it to call a static method of another object, the types of the parameters and returned value of this static method being identical to those of the original method, except with an additional this object. A second method is to insert bytecode before and after this calling bytecode to acquire the objects (parameters) in the stack and to restore the stack. Of course, another method is to directly modify the bytecode of the target method itself; with only one place needing to be modified. In the case of directly modifying a, method, for some classes that cannot be modified statically, such as classes (String, etc.) in Java Runtime Environment (JRE), a dynamic modification, method must be used, that is, the modification is made after the JVM is loaded.

In addition in a complete unit test case, apart from the target class object to be tested, there are alas objects needing to be mocked and other objects not needing to be mocked, which are the object parameters in the method calls to the target class object. For a Java program, the objects not needing to be mocked are usually some classes in the Java API, which can be replicated. The objects needing to be mocked can be determined, and if the objects needing to be mocked are not determined, then all the objects that have not been identified as not needing to be mocked will be treated as objects needing to be mocked. Captor code will also be added before and after method calls to the objects needing to be mocked, in order to record the behaviors of the objects needing to be mocked in the methods of the object to be tested, that is, the called methods and their returned values and other data. Through these two parts of recording, the mock objects can be generated using existing mock techniques for Java (e.g., JMock), and in turn unit test cases can be generated. A piece of pseudocode for implementing the captor code can be as follows:

```
// for recording the execution path and context of the object to be tested
class Captor_UnitTestObject {
    // The method will be inserted before a method call to the target object
    public static void beforeCall(String className, String methodName, String methodSig, Object thisObject, Object[ ] args) {
        // record the execution path
        RuntimeContextRecorder rc = RuntimeContextLogger.getRuntimeContextRecorder(className, thisObject);
        rc.recordContext(methodName, methodSig, thisObject, args);
        // register the mocked objects interested during the execution of the method
        rc.beginMockingMonitor(args);
    }
    // the method will be inserted after the method call to the target object
    public static void afterCall(String className, Object thisObject) {
        // remove the interest for the mocked object
        RuntimeContextRecorder rc = RuntimeContextLogger.getCurrentRuntimeContextRecorder( );
        rc.endMockingMonitor( );
    }
}
// for recording the behaviors of the mocked object
public class Captor_MockedObject {
    // the method will be inserted before the method call to the target object
    public static void beforeCall(String className, String methodName, String methodSig, Object thisObject, Object[ ] args) {
        // record the parameters of the call
        ObjectMocker om = RuntimeContextLogger.
        getCurrentRuntimeContextRecorder( ).getMocker( );
        om.addRecordBeforeCall(className, methodName, methodSig, thisObject, args);
    }
    // the method will be inserted after the method call to the target object
    public static void afterCall(String className, object thisObject, Object returnedObject, Throwable thrownObject) {
        // record the result of the call
        ObjectMocker om = RuntimeContextLogger.
        getCurrentRuntimeContextRecorder( ).getMocker( );
        om.addRecordAfterCall(className, thisObject, returnedObject, thrownObject);
    }
}
```

Wherein, RuntimeContextLogger is a class responsible for the management of the execution context information, maintaining the context information of all the interested objects. RuntimeContextRecorder is a class responsible for recording the context information of an interested object, and can be obtained by calling RuntimeContextLogqer.getRuntimeContextRecorder (Class className, Object thisObject), and its method recordContext can record the current context information. BeginMockingMonitor (Object[ ] args) method activates capturing the contexts of all the args objects for the generation of mock objects, and endMockingMonitor( ) method ends capturing the contexts of the mock objects. ObjectMocker is responsible for recording the captured contexts of the mock objects.

It should be noted that the above pseudocode and classes are only an example of the captor code of the present invention, and are not intended to limit the present invention. The captor code of the present invention can also be implemented by various other code and classes.

Figure 2:
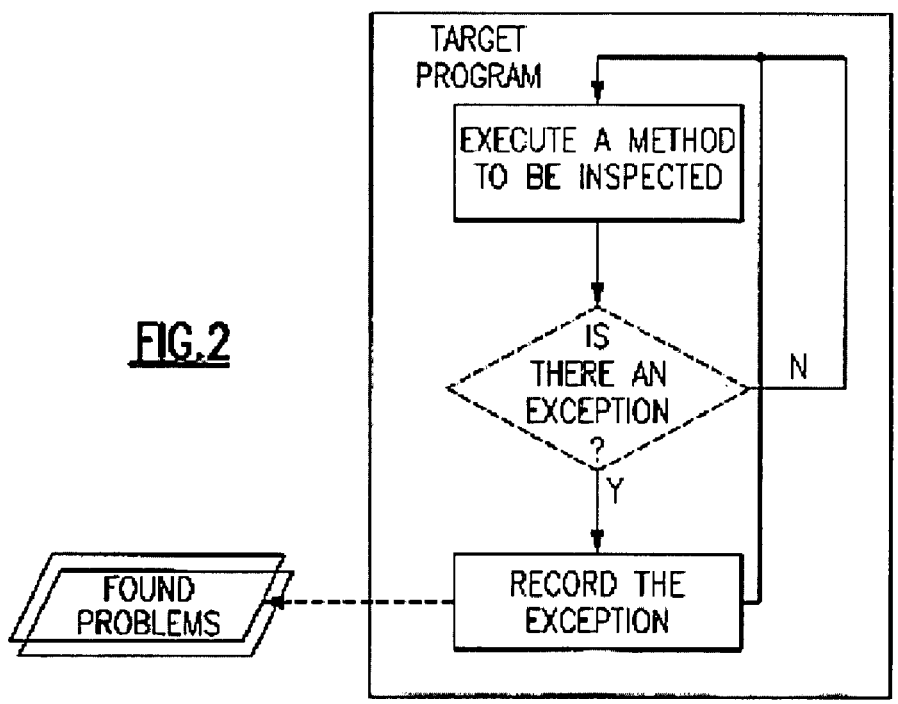
FIG. 2 illustrates a schematic flowchart of a process of detecting unexpected exceptions according to an embodiment of the present invention.
Figure 3:
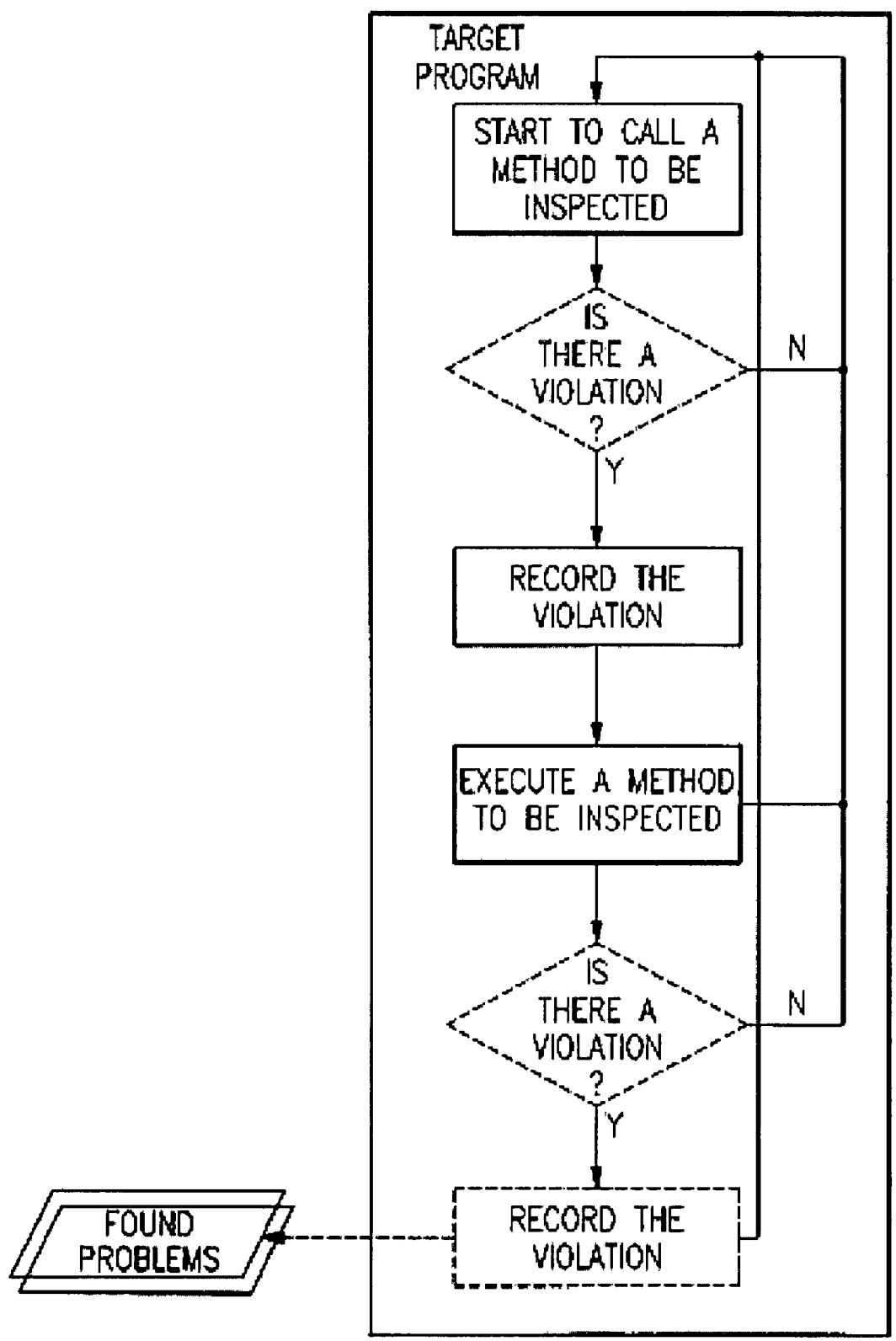
FIG. 3 illustrates a schematic flowchart of a process of detecting violations of predefined behavior rules according to an embodiment of the present invention.

The problem detective code is added before and after each method needing to be detected. As shown in FIG. 2, some code is added after a method call in order to detect the interested unexpectedly raised exceptions as specified in step 101. As shown in FIG. 3, other code is added before and after a method call, in order to find interested violations of behavior rules such as those specified in step 101, and thereby activating the generation of unit test cases. Preferably, the problem detective code is configured to record a problem in a problem list whenever the problem is found, in order to generate test cases after the end of the test execution. Alternatively, the problem detective code can also be configured to generate a test case based on a problem and the execution path and execution context as recorded by the detective code whenever the problem is found. A piece of pseudocode for implementing the above substring rule can be as follows:

```
public class Detective_StringSubstring {
    // this method will be inserted before the method call to String.subString
    public static void beforeCallX(String className, String methodName,
    String methodSig, Object thisObject, Object[ ] args) {
        AbstractNeverCallXRule rule = DetectiveManager.
        loadRule("Globalization.CodePointHandling.StringSubString",thisObject);
        // rule.matchedX contains the examination code
        if (rule.matchedX(thisObject, args)) {
            DetectiveManager.addViolation(rule);
            DetectiveManager.generateTestCase( );
        }
    }
}
```

Wherein, AbstractNeverCallXRule is a rule abstract class for hiding the specific implementation of a rule. DetectiveManager is used to load various rule classes, examine the context by calling the methods in the rule classes, and then determine whether to activate generateTestCase( ).

It should be noted the above pseudocode and classes are only an example for implementing the detective code of the present invention, and are not intended to limit the present invention. The detective code of the present invention can also be implemented with other code and classes.

Preferably, the target program modified in step 102 is provided to the testing team, in order to be tested in the testing environment.

In step 103, the target program is test executed. Preferably, the step 103 is performed in a testing environment.

During the test execution, before each method call to the target class, the captor code captures the call and the parameters of the call. Then the original method call is executed. During the execution of the method call, the detective code try to find unexpected exceptions and violations of behavior rules, and preferably record them into a problem list.

In step 104, unit test cases are generated.

After the target program terminates, the system can use the recorded execution paths and execution contexts and the problem list to generate unit test cases.

Alternatively, during the execution of the target problem, whenever an interested problem is found, a test case can be generated based on the problem and the recorded execution path and execution context.

For a Java program, unit test cases can be formed into a Java source file containing test case classes for JUnit.

A generated unit test case describes the execution path and execution context of an object from its construction until a problem is found. The execution path comprises a series of method calls to the object, except internal method calls performed by its other methods. The execution context comprises the values of the parameters needed by the method calls.

Figure 4:
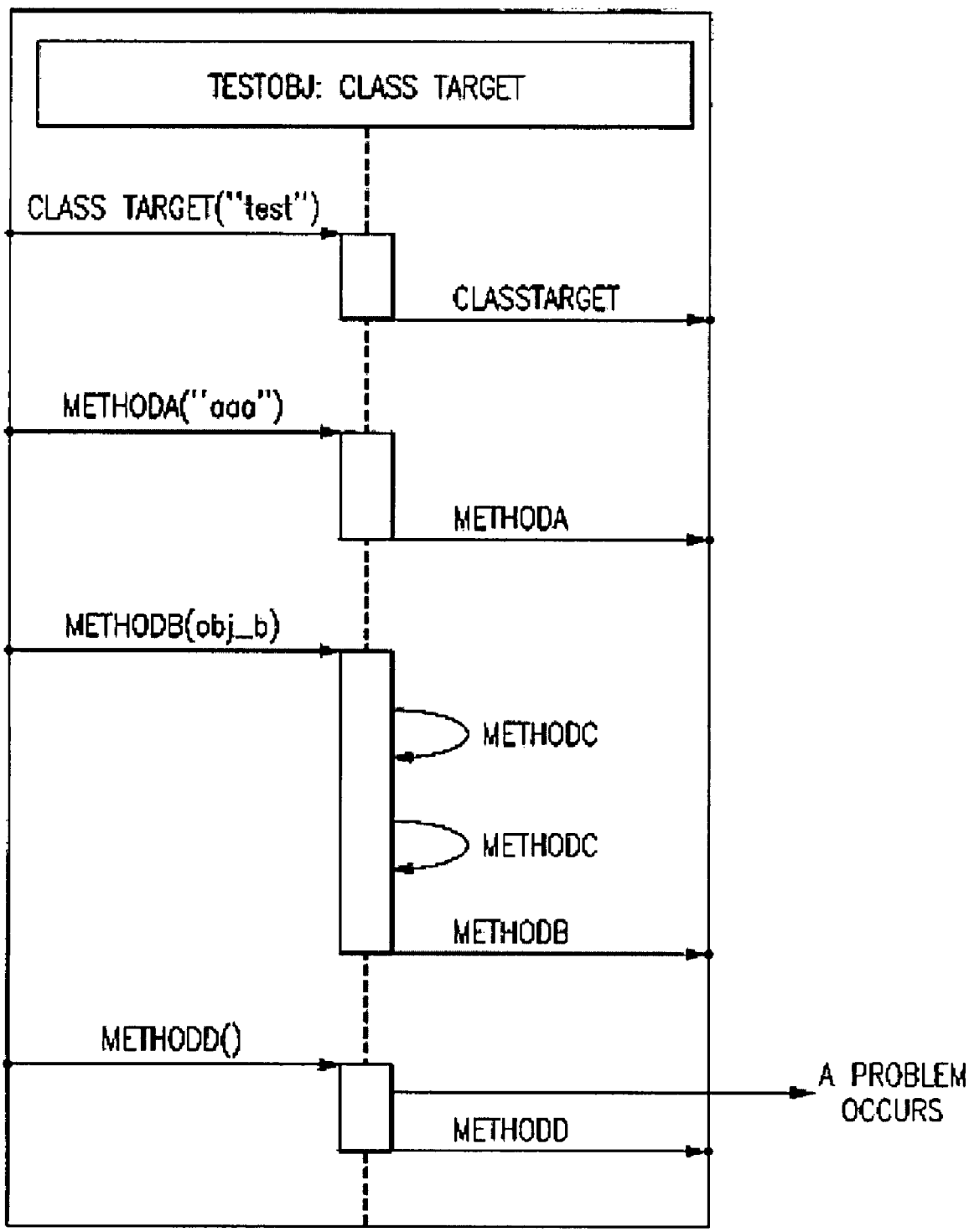
FIG. 4 illustrates a schematic diagram of the interactions of an object during the execution of the program under test.

For example, an object named testObj has the interactions as shown in FIG. 4 during its execution. The object testObj is an instance of a class ClassTarget. It is created by calling a constructor ClassTarget(String). At sometime in the execution of the program, methods methodA, methodB, methodC and method are called in turn when methodD is called, a problem occurs. Since methodC is called internally by methodB, the execution path of the object testObj should be ClassTarget-> methodA-> methodB-> methodD.

In a unit test case, the parameters passed to the method calls are treated as the test data to be replicated or mocked. Values of primitive types (e.g., int, float, and char) and serializable objects (e.g., the string "test" in FIG. 4) can be replicated, while unserializable (i.e., unreplicable) objects (e.g., obj_b in FIG. 4) can be mocked. Only when all the fields of an object are serializable or of primitive types, can this object be serializable. A replica or mock object can provide the same behaviors as the original replicated or mocked object during its execution.

During or after the execution of the modified program, the system can generate a test case as follows:

String s1="test";
    String s2="aaa";
    DataObject o1=new Mock_DataObject( );
    ClassTarget testObj=new ClassTarget(s1);
    testObj.methodA s2);
    testObj.methods(o2);
    testObj.methodD( ); //a problem is found FIG. 5 illustrates the sub-steps in the step 104 of generating unit test cases based on the problem list and the execution paths and execution contexts in the above method for generating unit test cases that can reproduce runtime problems according to an embodiment of the present invention.

As shown in step 501, all the unexpected exceptions and violations of predefined behavior rules in the problem list are traversed through.

In step 502, for each of the unexpected exceptions or violations of predefined behavior rules, the corresponding execution path and execution context as well as the called methods, calling parameters and returned values thereof in the target class of the unreplicable objects as recorded by the captor code are obtained.

In step 503, mock objects of the unreplicable objects are generated based on the called methods, calling parameters and returned values thereof in the target class of the unreplicable objects. Preferably, as will be understood by those skilled in the art, the following method can be used to generate a mock class. A subclass of the mocked object is generated, as a mock class to mock the object. The mock methods in the subclass will override the original methods of the mocked object, and return the same values as the returned values of the original method. That is to say, all instance object of the subclass will have the same behaviors as the original object. As will be understood by those skilled in the art, the above mentioned method for inserting bytecode can also be used to implement mocking dynamically.

In step 504, test data structures and test target execution paths are generated based on all the relevant execution paths and execution contexts and the generated mock classes, and are combined into unit test cases.

The generated unit test cases can be provided to the development team to facilitate debugging the found problems, or to facilitate regression tests which will be performed after the program is modified.

In the foregoing, the embodiments of the method of the invention for automatically generating unit test cases that can reproduce runtime problems have been described largely by taking a Java object oriented program as an example, it should be noted, however, that the present invention is also applicable to other object oriented programs. Moreover, since the core idea of the present invention does not rely on the object oriented concept, the present invention is also applicable to non-object oriented programs. For example, in a non-object oriented programs a function can be treated as a program unit for unit testing. As such, the captor code and problem detective code will be used to record the execution path and execution context of a specified function, and to detect specified unexpected exceptions or violations of predefined rules in the process of its execution, and to generate unit test cases thereby.

The above described method for automatically generating unit test cases that can reproduce runtime problems according to an embodiment of the present invention automatically generates unit test cases that can reproduce runtime problems largely by modifying the program based on the interested target classes and runtime problems specified before the verification test, and then executing the modified program during the process of the verification test. According to another embodiment of the method for automatically generating unit test cases that can reproduce runtime problem of the present intention, it is also possible not to specify the interested target classes and runtime problems before the verification test and to modify the program, but first to perform a normal verification test and produce problem descriptions; or in addition to automatically generate unit test cases that can reproduce runtime problem in the test execution step in the method according to the above embodiment of the present invention, to generate the problem descriptions bout other undetermined runtime problems. The developers, after receiving the problem descriptions, can determine the places in code where the problems occur by simple debugging, and then by custom-defining new rules or by directly inserting into the code exception code which can activate the invention to generate test cases, obtain the test cases directly. These test cases can be added into an automatic unit test process, thus avoiding developing unit test cases manually, to lower the coat of verifying new code changes.

FIG. 6 illustrates the steps of the method for automatically generating unit test cases for a computer program that can reproduce runtime problems according to this other embodiment of the present invention. As shown, in step 601, according to the test problem descriptions generated in the verification test of the computer program, the nature of the problems and the program units where the problems occur are determined. In step 602, captor code and problem detective code are added into the program, the captor code being configured to recording the execution paths and execution contexts of program units in the program, and the problem detective code being configured to detect the problems in the execution of the program based of the determined nature of the problems. In step 603, the program is test executed. And finally in step 604, unit test cases acre generated based on the detected problems and the relevant execution paths and contexts as recorded by the captor code.

According to another aspect of the present invention, there is further provided a method for debugging a computer program. Preferably, the method comprise the following steps: using the above method for automatically generating unit test cases that can reproduce runtime problems to automatically generate unit test cases of the computer program in the verification test environment; and debugging by running the unit test cases in the development environment. Since the unit test cases are automatically generated during the verification test with respect to the target classes and possibly occurring runtime problems as specified by the developers in advance, running the unit test cases in the development environment will reproduce the runtime problems encountered in the test environment, thus facilitating the debugging of the program and solving of the problems.

According to still another aspect of the present invention, there is further provided a method for regression test on a computer program. Preferably, the method comprises the following steps; generating unit test cases of the computer program by using the above method for automatically generating unit test cases; and after the computer program is modified, performing regression test on the computer program by ruining the unit test cases on the modified computer program. By using such as method, the unit test cases for regression tests can be generated automatically, thus avoiding the developers' tedious manual development. The automatically generated unit test cases can be used by the developers to check whether previously solved problems remain to be solved after modifications or updates of the program, or be used by the testers to perform the same check, or be used by both the developers and the testers.

According to yet another aspect of the present invention, there is further provided a computer program testing method. Preferably, the method comprises the following steps: adding captor code and problem detective code into the program, wherein the captor code is configured to record the execution paths and execution contexts of interested target program units in the program, and the problem detective code is configured to detect and record interested unexpected exceptions possibly raised and violations of interested predefined behavior rules possibly produced in the execution of the interested program units; and test executing the program with the additions to detect and record the interested unexpected exceptions and violations of predefined behavior rules. Preferably, the method further comprises the step of defining rules to define the interested predefined behavior rules. One method for defining rules is by determining a rule template and a target method, and developing the examination code for each rule. By this method, it is possible to find during the testing process potential errors that have not yet exhibited, thus facilitating testing the program.

In the foregoing, a method for automatically generating unit test cases that can reproduce runtime problems according to an embodiment of the present invention, and a method for debugging a computer program, a method for performing regression test on a computer program, and a computer program testing method based thereon have been described. Correspondingly, the present invention further provides a system for automatically generating unit test cases for a computer program that can reproduce runtime problems.

Figure 7:
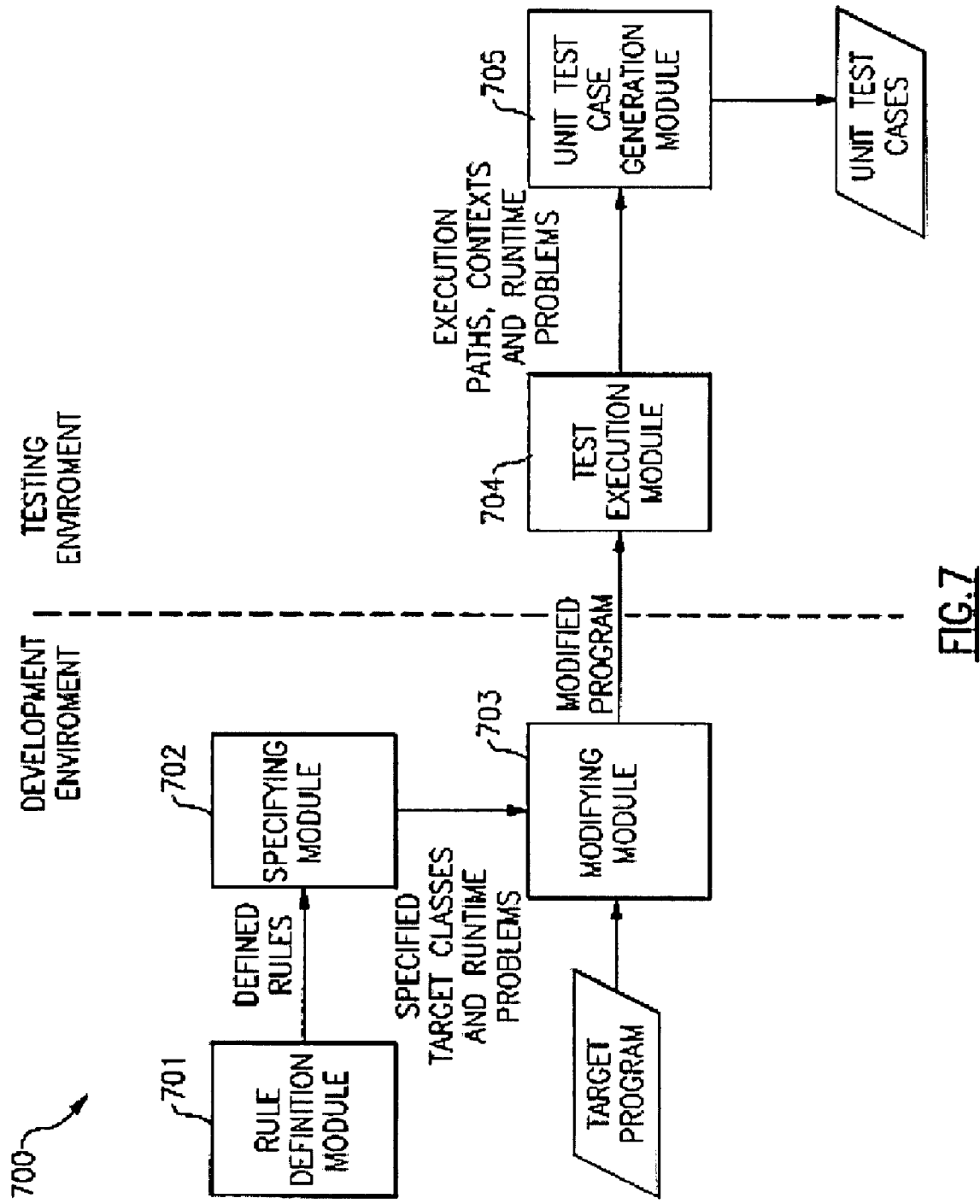
FIG. 7 illustrates a block diagram of a system for automatically generating unit test cases which can reproduce run time problems according to an embodiment of the present invention.

FIG. 7 illustrates the block diagram of a system 700 for automatically generating unit test cases for a computer program that can reproduce runtime problems according to an embodiment of the present invention. As shown, the system 700 comprises: a modifying module 703 for modifying the program based on interested one or more target program units and runtime problems; a test execution module 704 for test executing the modified program; and a unit test case generation module 705 for automatically generating unit test cases based on the interested runtime problem occurred during the execution of the interested program units.

Preferably, the runtime problems include unexpected exceptions and violations of predefined behavior rules.

Preferably, the modifying module 703 is configured to: add captor code into the program, the captor code being configured to record the execution paths and execution contexts of the interested target program units in the program; and add problem detective code into the program, the problem detective code being configured to detect the interested unexpected exceptions possibly raised and the violations of interested predefined behavior rules possibly produced by the execution of the program.

Preferably, the problem detective code is further configured to activate the unit test case generation module 705 to generate a unit test case based on the execution path and the execution context as recorded by the captor code each time an interested unexpected exception or a violation of predefined behavior rules is detected.

Alternatively, the problem detective code is further-configured to record an unexpected exception or a violation of a predefined behavior rule in a problem list each time the unexpected exception or the violation of the predefined behavior rule is detected, and the unit test case generation module 705 is configured to generate unit test cases based on the problem list and the execution paths and execution contexts as recorded by the captor code after the test execution is completed.

Preferably, the computer program is an object oriented program, and more particularly, for example, a Java bytecode program, the program unit is a class, the execution path is the sequence of every eternal method call to an instance object of the target class, and the execution context is the values of the parameters and the returned values of every external method call to an instance object of the target class. It should be noted, however, that the present invention is also applicable to non-object oriented programs. For example, in a non-object oriented program, individual functions can be treated as the program units to be unit tested. As such, the captor code and problem detective code according to the present invention will be used to record the execution paths and execution contexts of the specified functions, and to detect specified unexpected exceptions or violations of predefined behavior rules possibly occurring during the execution thereof, and to generate unit test cases thereby.

Preferably, the captor code is further configured to record the called methods, calling parameters and returned values thereof in the target class of the unreplicable objects in the calling parameters of the instance objects of the target class, and the unit test case generation module 705 is configured to generate mock objects of the unreplicable objects in the calling parameters of the instance objects of the target class based on the called methods, calling parameters and returned values thereof of the unreplicable objects in the target class as recorded by the captor coder and to generate unit test cases based on the relevant execution paths and execution contexts as recorded by the captor code and the generated mock objects.

The inputs of the modifying module 703 are the target program for which test cases will be generated and the interested target class and runtime problems as specified by the user and its outputs are the modified target program containing the captor code and problem detective code. The modified target program will be provided to the test execution module 704 for text execution.

In a preferred embodiment of the present invention the modifying module 703 is a bytecode insertion tool, such a common bytecode insertion tool, which can add the captor code and problem detective code by modifying the class files of the target program. In another embodiment of the present invention, however, there are also provided methods that can be invoked from source code. As such, the modifying module 703 can be a tool that can add the captor code and problem detective code in the source code. Or the captor code and problem detective code can be added manually in order to activate the generation of test cases, in which case, the modifying module 703 can be considered to be the editing tool used in the manual addition.

In a preferred embodiment of the present invention, the test execution module 704 is a con testing system or part thereof. In another embodiment of the present invention, the test execution module 704 is a testing module specific to the present invention. In addition, the test execution module 704 and the unit test case generation module 705 can either be integrated together in any of a variety of ways as known to those skilled in the art, such as in the form of plug-ins or in the form of a single module containing these two functions; or be two separate modules physically connected together, or be two modules only logically coupled together but physically separate, in which case these two modules only form a logical linking relationship through the execution path and execution context records and the runtime problem list outputted by the test execution module 704 as the inputs to the unit test case generation module 705.

The inputs of the unit test case generation module 705 are the execution path and execution context records and the found problems outputted by the test execution module 704, and its outputs are the generated unit test cases. The unit test cases can be provided to the development team to facilitate debugging the problems found during the test execution, or to facilitate a regression test performed after the program is modified. Preferably, the unit test case generation module 705 is configured to form the unit test cases into a Java source file containing JUnit test case classes.

Preferably, the system 700 further comprises a specifying module 702 for specifying interested target program units in the program and the interested unexpected exceptions and, or violations of predefined behavior rules.

The outputs of the specifying module 702 are configuration information including the target classes and runtime problems. The specifying module 702 can be a GUI tool. The tool, apart from allowing the user to specify interested target classes and exceptions, can further list a tree of all defined rules, allowing the user to check the rules to be applied. Of course, a GUI tool actually only provides a convenient means to generate the configuration information to be provided to the second step and the user can manually write these configuration in a situation where only a command line interface is available. In addition, the functions of the specifying module 702 can also be implied in the operations of the modifying module 703, that is, the interested target classes and runtime problems are only embodied in determining where and how the target program is to be modified during modifying the target program manually or through a tool, and in which case, the system 700 will not have the specifying module 702.

Preferably, the system 700 further comprises a rule definition module 701 for defining predefined behavior rules which can be specified by the specifying module 702. A predefined behavior rule describes the behaviors that a specified program unit ought to exhibit, including the proper method calling order, valid method parameters and returned values. Defined rules can be stored in a rule repository for retrieval by the specifying module 702, or be provided directly to the specifying module for its use. A set of behavior rules can be generated for each program to be tested or for each test of a program, or a behavior rule repository can be created to be shared by multiple programs.

The rule definition module 701 preferably is configured to define a rule through the following steps determining a rule template containing the placeholders of a target method and examination code; specifying the target method; and developing the examination code. Rule templates are some predefined patterns, such as "Never call <X> when <CONDITION>", "Never call <X> before <Y> of an object when <CONDITION>", etc. A target method defines specifically what method of what class the "<X>", "<Y>" in the template are, which determine the location where the examination code is to be inserted. The examination code is to implement the examination of the <CONDITION> in the template on the object, parameters, and returned value of the target method before and after the method is called. In a preferred embodiment of the present invention, the examination code is implemented by inheritance from a rule abstract class. For example, for the above mentioned template "Never call <X> when <CONDITION>", it is needed to inherit from an AstractNeverCallXRule class, and overload the matchedX method therein, thereby the examination can be performed with respect to the obtained context. The rule abstract class is part of the template, through which the specific implementation of the template is hidden, thus developers can focus on the development of the examination code when developing a rule.

It should be noted that the step of defining a rule to be specified through a rule template and rule abstract class is only one implementation of defining and specifying a rule of the present invention. The present invention can also adopt other methods for defining and specifying a ruler such as by inserting examination code directly the step of defining and specifying a rule are implied in the process of inserting the examination code), etc.

Preferably, the modifying module 703, specifying module 702 and rule definition module 701 reside in the development environment, while the test execution module 704 and unit test case generation module 705 reside in the test environment. However, other arrangements are also possible, for example, the modifying module 703, specifying module 702, rule definition module 701, as well as the test execution module 704 and the unit test case generation module 705 all reside in the development environment, or all reside in the test environment, or reside in both environment, or reside in other environments.

Figure 8:
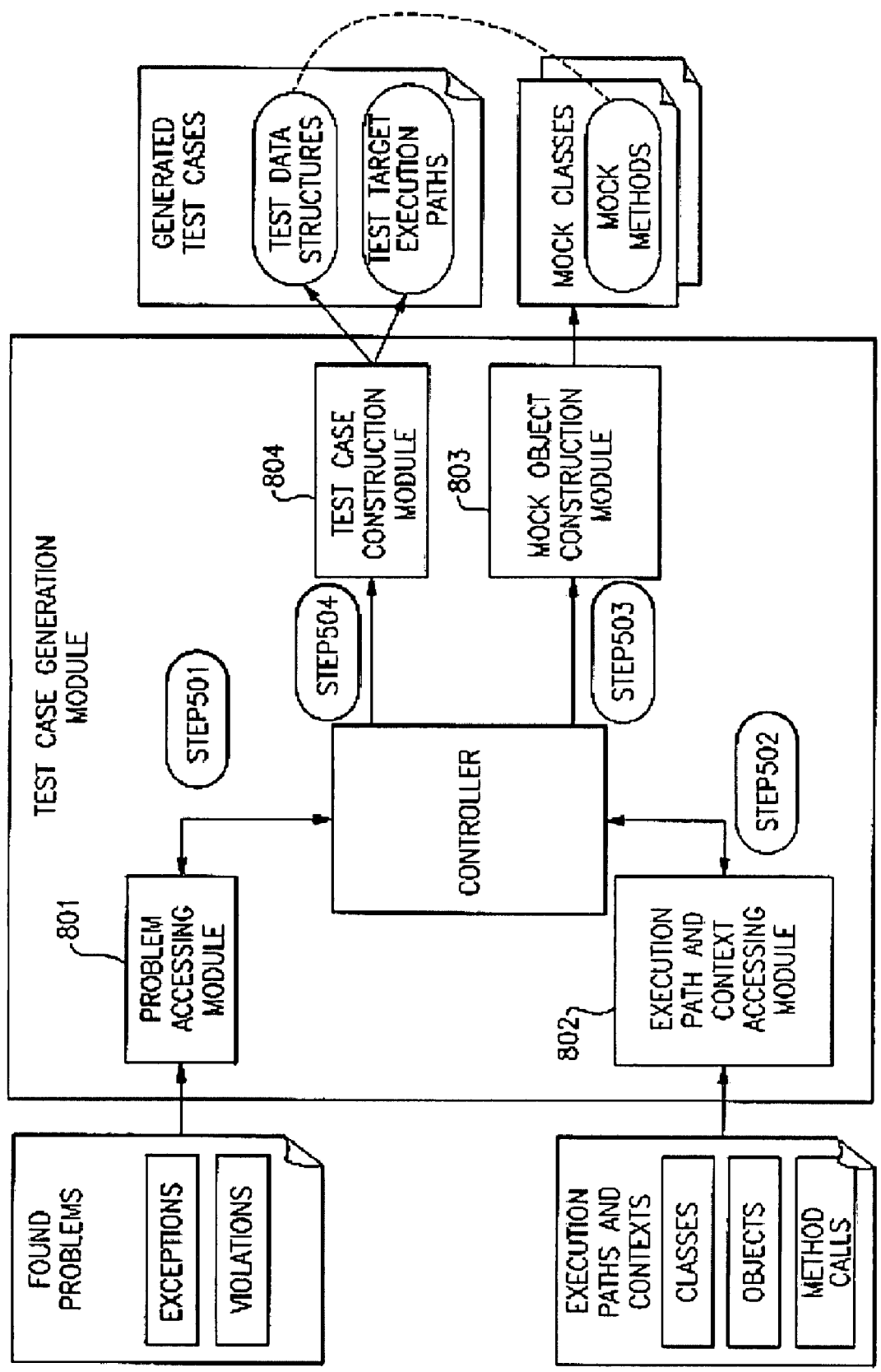
FIG. 8 illustrates a schematic structural diagram of a unit test case generation module according to another aspect of the present invention.

FIG. 8 illustrates a schematic structural diagram of a unit test case generation module 705 according to a further embodiment of the present invention. As shown, the unit test case generation module 705 comprises a problem list accessing module 801 for traversing through each unexpected exception or violation of a predefined behavior rule in the problem list as generated by the test execution module 704; an execution path and context accessing module 802 for accessing the corresponding execution path and execution context and the called methods, calling parameters and returned values thereof in the target class of the unreplicable objects in the calling parameters as recorded by the captor code; a mock object construction module 803 for generating mock objects of the unreplicable objects in the calling parameters based on the accessed called methods, calling parameters and returned values thereof in the target class of the unreplicable objects; and a unit test case construction module 804 for constructing unit test cases based on the accessed execution paths and execution contexts and the generated mock objects.

The above described system 700 for automatically generating unit test cases that can reproduce runtime problems according to the embodiments of the present invention are mainly used in scenarios where the target program is modified based on the interested target classes and runtime problems as specified before the verification test, and then unit test eases are automatically generated by executing the modified target program in the verification test. However, the system 700 for automatically generating unit test cases that can reproduce runtime problems according to embodiments of the present invention can also be used in scenarios where rather than specifying interested target classes and runtime problems and modifying the program before the verification test, a normal verification test is first performed and the problem descriptions are generated, or in the above scenarios where the interested target classes and runtime problems are specified before the verification test, in the test execution step, apart from automatically generating unit test cases that can reproduce runtime problems, the problem descriptions of other unspecified runtime problems are also generated. In such scenarios, after obtaining the problem descriptions, the developers can determine the places in code where the problems occurred through simple debugging, and then directly obtain test cases by custom-defining new rules or by directly inserting into the code that can activate the present invention to generate test cases. These test cases can be added into an automatic unit test process, thus avoiding manually developing unit test cases, to lower the cost of verifying new code changes.

When the system for automatically generating unit test cases for a computer program that can reproduce runtime problems according to embodiment of the present invention is used in such scenarios, the rules as defined by the rule definition module 701 and as specified by the specifying module 702 are derived from the test problem descriptions generated during the verification test, and the interested exceptions and target classes as specified by the specifying module 702 are also derived from the test problem descriptions. Thereafter, after the target program is modified by the modifying module 703 based on the derived target classes and exceptions and/or rules it is preferably test executed in the test execution module 704 in the development environment, and the unit test case generation module 705 will generate unit test cases based on the execution paths and execution contexts and runtime problems generated in the test execution. The unit test cases will mainly be used in future regression tests of the target program.

According to another aspect of the present inventions there is also provided a system for debugging a computer program. Preferably, the system comprises: the system 700 for automatically generating unit test cases that can reproduce runtime problems according to any of the above embodiments; and a debugging apparatus for debugging a computer program by executing the unit test cases as generated by the system 700 for automatically generating unit test cases that can reproduce runtime problems. Since the unit test cases were automatically generated during the verification test in respect of the target classes and possibly occurring runtime problems as specified by the developers in advance, executing the unit test cases in the development environment will reproduce the runtime problems that have been encountered in the test environment, thus facilitating debugging the program and solving the problems.

According to still another aspect of the present invention there is also provided a system for regression test of a computer program. Preferably, the system comprises the system 700 for automatically generating unit test cases that can reproduce runtime problems according to any of the above embodiments; and a regression test apparatus for performing regression test on a computer program after the computer program is modified by executing the unit test cases generated by the system 700 for automatically generating unit test cases that can reproduce runtime problems before the computer program is modified with this method, unit test cases for regression test can be generated automatically, thus avoiding tedious manual development by developers. The automatically generated unit test cases can either be used for checking by the developers whether old solved problems remain to be solved after the program is modified or updated, or be used for the same checking by the testers, or be used by both the developers and the testers.

According to another aspect of the present invention, there is also provided a computer program testing apparatus. Preferably, the apparatus comprises; a modifying module for adding captor code and problem detective code into the program, the captor code being configured to record the execution paths and execution contexts of interested target program units in the program, and the problem detective code being configured to detect and record the interested unexpected exceptions possibly raised and the interested violations of predefined behavior rules possibly produced by the execution of the program units; and a test execution module for test executing the program with the additions to detect and record the interested unexpected exceptions and violations of predefined behavior rules occurring during the execution of the program units.

Preferably, the apparatus further comprises a rule definition module for defining the interested predefined behavior rules. Preferably, the rule definition module is configured to define a rule by determining a rule template and target method, and by developing the examination code. Using such a computer program testing apparatus, it is possible to find potential problems not yet occurring, thus facilitating the testing of the program.

In the foregoing, the method and system for automatically generating unit test cases that can reproduce runtime problems according to embodiments of the present invention, the method and system for debugging a computer program, a method and system for regression test on a computer program, and a computer program testing method and system have been described with reference to the drawings.

It should be noted that the drawings are only illustrative, and are not intended to limit the present invention. A drawing can illustrate a single embodiment of the present invention, but it is not necessary, rather it can illustrate a combination of multiple embodiments. Moreover, it is contemplated that any combination of the features and elements described above can be used to implement and practice the present invention, regardless whether they relate to different embodiments or not. It will be understood by those skilled in related arts that the present invention can be implemented without one or more specific features or advantages of specific embodiments. In other situations additional features and advantages can be present in some embodiments, while they may not appear in any other embodiments of the present invention. The languages relating to features and advantages should be understood as meaning that specific features, advantages and characteristics described in relation to specific embodiments are contained in at least one embodiment of the present invention. Therefore, the discussions of the features and advantages throughout this description and similar language can but not necessarily refer to the same embodiment.

In addition, in various embodiments, the present invention provides numerous advantages over the prior art. However, although embodiments of the present invention can obtain advantages over other possible solutions and/or the prior art, whether a specific advantage will be obtained through a given embodiment is not a limitation of the present invention. Therefore, the aspects, features, embodiments and advantages are only for the purpose of illustration, except definitely set forth in the appended claims similarly, reference to "the present invention" should not be explained as a summary of any inventive subject disclosed herein, nor be construed as an element or limitation of the appended claims, except definitely set forth in the claims.

These features and advantages of the present invention are either apparent from the above description or the appended claims, or can be understood by practicing the present invention as described above.

Many functional units described herein have been identified as modules for specially emphasizing their implementation independence. For example, the modules can be realized as hardware circuits including customized VLSI circuits or gate arrays, off-the-shelf semiconductors such as logic chips, transistors and other discrete elements. The modules can also be implemented as programmable hardware devices such as field programmable gate arrays, programmable array logics, programmable logic devices, etc.

The modules can also be implemented as software that can be executed by various processors. The identified modules of executable code can include one or more physical or logical blocks of computer instructions that can be organized into objects, procedures or functions. However, the executable instructions of an identified module need not reside together physically, rather it can contain different instructions stored indifferent locations, these different instructions, when being coupled together logically, constituting the module and implementing the specified purpose of the module.

Actually, a module of executable code can be a single instruction or multiple instructions, or be distributed in different code segments, different programs or different storage devices. Similarly, the operation data can be identified and described in modules, and can be embodied in any suitable forms and organized into any suitable types of data structure. The operation data can be collected into a single data set, or be distributed into different locations and contained in different storage devices, and can at least in part only exist as electronic signals in a system or network.

Additionally, in the above description, many specific details such as examples of programming, method steps, user choices, system modules, etc are provided in order to provide thorough understanding of the embodiments of the present invention. However, it will be understood by those skilled in the art the present invention can be implemented without one or more of the specific details, or be implemented with other steps or elements. In other embodiments, commonly known elements or operations are not illustrated or described in detail in order not to obscure aspects of the present invention.

Further, the nomenclature of any specific module, apparatus, system, method, and step above is only used for convenience, and therefore are not intended to limit the present invention.

The above illustrative flowcharts are generally presented as logic flowcharts. Therefore, the illustrated orders and identified operations indicate the embodiments of the presented methods. Other operations and methods equivalent to one or more operations of the methods shown or parts thereof functionally, logically or in effect can be contemplated. In addition, the execution order of a specific method may or may not comply with the illustrated order of the operations, some steps may be combined together, be further divided into more detailed steps, some new steps may be added, or some steps may be removed.

Similarly, the linking relationships between the modules of the described system and apparatus can change, they can be combined into larger modules, be divided into smaller modules, some new modules may be added, or some modules may be removed. Provided only that they can implement the functions of the present invention, these changes are all within the spirit and scope of the present invention.

The present invention can be realized in hardware, software, or a combination of hardware and software. The present invention can be realized in a centralized fashion in one computer system or in a distributed fashion where different elements are spread across several interconnected computer systems. Any kind of computer system or other apparatus adapted for carrying out the methods described herein is suited. A typical combination of hardware and software can be a general-purpose computer system with a computer program that, when being loaded and executed, controls the computer system such that it carries out the methods described herein.

The present invention also can be embedded in a computer program product, which comprises all the features enabling the implementation of the method described herein, and which when loaded in a computer system is able to carry out these methods. The program product can be contained in a variety of signal bearing media. Typical signal-bearing media include but are not limited to (i) information permanently stored in non-writable storage media (e.g., read-only storage devices in a computer, such as a CD-ROM disk to be read by a CD-ROM driver), (ii) alterable information stored in a writable storage media (e.g., floppy diskette in a floppy driver a hard disk driver), and (iii) information transmitted to a computer over communication media, such as computer and telephone networks including wireless communication networks. The signal carrying media, when carrying computer readable instructions that direct the functions of the present invention, represent embodiment of the present invention.

While the invention has been particularly shown and described with reference to preferred embodiments, it will be understood by those skilled in, the art that various changes in form and detail may be made therein without departing from the spirit and scope of the invention.

What is claimed is:

1. A method, executed by at least one central processing unit (CPU), for automatically generating unit test cases for a computer program that can reproduce runtime problems, wherein the runtime problems comprises unexpected exceptions and violations of predefined behavior rules, the method comprising the steps of:
   specifying one or more specific target program units selected from one or more target program units in the program;
   specifying one or more specific runtime problems, wherein the one or more specific runtime problems comprises runtime problems that occur during testing of the one or more specific target program units;
   modifying the computer program according to the one or more specific target program units in the program and the one or more specific runtime problems, the modified computer program is configured to detect the one or more specific runtime problems and record execution paths and contexts;
   test executing the modified program; and
   automatically generating unit test cases according to the one or more specific runtime problems occurring during the execution of the one or more specific target program units.

2. The method according to claim 1, further comprising the step of defining a behavior rule.

3. The method according to claim 2, wherein the step of defining a behavior rule comprises:
   determining a rule template containing the placeholders of a target method and examination code;
   specifying the target method; and
   developing the examination code.

4. The method according to claim 1, wherein the modifying step comprises the sub-steps of:
   adding captor code into the program, the captor code being configured to record the execution paths and execution contexts of the one or more specific target program units in the program; and
   adding problem detective code into the program, the problem detective code is configured to detect the one or more specific runtime problems raised and produced during the execution of the program units.

5. The method according to claim 4, wherein the computer program is an object oriented program, the target program unit is a class, an execution path is the sequence of external method calls to an instance object of the target class, and the execution context is the values of the parameters and the returned values of external method calls to an instance object of the target class.

6. The method according to claim 5, wherein the captor code is further configured to record the called methods, calling parameters and returned values thereof in the target class of the unreplicable objects in the calling parameters of the instance object of the target class, and the step of automatically generating unit test cases comprises:
   generating mock objects of the unreplicable objects in the calling parameters of the instance objects of the target class based on the called methods, calling parameters and returned values thereof in the target class of the unreplicable objects as recorded by the captor code; and
   generating unit test cases based on the relevant execution paths and execution contexts as recorded by the captor code and the generated mock objects.

7. The method according to claim 5, wherein the problem detective code is further configured to activate the step of automatically generating unit test cases to generate a unit test case based on the execution path and the execution context as recorded by the captor code each time the one or more specific runtime problems is detected.

8. The method according to claim 7, wherein the generated unit test case comprises the sequence of the external method calls to an instance object of the target class from the construction thereof until the detection of the one or more specific runtime problems, and the values of the parameters of each of the external method calls.

9. The method according to claim 5, wherein the problem detective code is further configured to record the one or more specific runtime problems in a problem list each time the one or more specific runtime problems is detected, and the step of automatically generating unit test cases comprises generating unit test cases based on the problem list as well as the relevant execution paths and execution contexts as recorded by the captor code after the test execution is completed.

10. The method according to claim 9, wherein the captor code is further configured to record the called methods, calling parameters and returned values thereof in the target class of the unreplicable objects in the calling parameters of the instance objects of the target class, and wherein the step of generating unit test cases based on the problem list as well as the relevant execution paths and execution contexts as recorded by the captor code comprises the sub-steps of:
   traversing each of the one or more specific runtime problems in the problem list;
   for each of the traversed one or more specific runtime problems, accessing the corresponding execution path and execution context, as well as the called methods, calling parameters and returned values thereof of unreplicable objects in the target class as recorded by the captor code;
   generating mock objects of the unreplicable objects based on the accessed called methods, calling parameters and returned values thereof of the unreplicable objects in the target class; and
   constructing unit test cases based on the accessed corresponding execution paths and execution contexts, as well as the generated mock objects.

11. A method, executed by at least one central processing unit (CPU), for automatically generating unit test cases for a computer program that can reproduce runtime problems, wherein the runtime problems comprises unexpected exceptions and violations of predefined behavior rules, the method comprising the steps of:
   specifying one or more specific target program units selected from one or more target program units in the program;
   specifying one or more specific runtime problems, wherein the one or more specific runtime problems comprises runtime problems that occur during testing of the one or more specific target program units;
   modifying the program based on the determined nature of the problems and the program units where the problems occurred, the modified computer program is configured to detect the one or more specific runtime problems and record execution paths and contexts;

test executing the modified program; and generating unit test cases based on the detected problems and the execution paths and contexts as recorded during the test execution of the modified program.

12. The method according to claim 11, wherein the modifying step comprising the steps of:

adding captor code into the program, the captor code being configured to record the execution paths and execution contexts of the one or more specific program units in the program; and adding problem detective code into the program, the problem detective code being configured to detect the one or more specific runtime problems raised and produced during the execution of the program units in the program.

13. A computer program testing method, executed by at least one central processing unit (CPU), comprising-the steps of:

specifying one or more specific target program units selected from one or more target program units in the program;

specifying one or more specific runtime problems, wherein the one or more specific runtime problems comprises runtime problems that occur during testing of the one or more specific target program units;

modifying the program according to the one or more specific target program units in the program and the one or more specific runtime problems, the modifying comprising adding captor code and problem detective code into the program, the captor code being configured to record the execution paths and execution contexts of the one or more specific target program units in the program, and the problem detective code being configured to detect and record the one or more specific runtime problems raised and generated during the execution of the program units; and test executing the modified program with the additions to detect and record the one or more specific runtime problems.

14. The computer program testing method according to claim 13, further comprising the step of defining predefined behavior rules.

\* \* \* \* \*